(12) United States Patent
Chen

(10) Patent No.: US 7,261,410 B1
(45) Date of Patent: Aug. 28, 2007

(54) BUCKLE DEVICE FOR FRAMELESS EYEGLASSES

(76) Inventor: Chih-Ming Chen, No. 19, Alley 4, Lane 234, Sec. 5, Her Wei Road, Tainan City (TW)

( * ) Notice: Subject to any disclaimer, the term of this patent is extended or adjusted under 35 U.S.C. 154(b) by 0 days.

(21) Appl. No.: 11/471,525

(22) Filed: Jun. 21, 2006

(51) Int. Cl.
*G02C 1/02* (2006.01)

(52) U.S. Cl. ...................................... 351/110; 351/116

(58) Field of Classification Search ................ 351/110, 351/156, 157, 116, 111, 41; 2/245, 246
See application file for complete search history.

(56) References Cited

U.S. PATENT DOCUMENTS

| | | | | |
|---|---|---|---|---|
| 5,007,728 A | * | 4/1991 | Magorien | ................... 351/118 |
| 5,987,652 A | * | 11/1999 | Fowler | ........................... 2/424 |
| 6,908,194 B1 | * | 6/2005 | Johnson | ...................... 351/156 |
| 7,059,717 B2 | * | 6/2006 | Bloch | ......................... 351/119 |

* cited by examiner

*Primary Examiner*—Hung Xuan Dang
(74) *Attorney, Agent, or Firm*—Rosenberg, Klein & Lee

(57) ABSTRACT

A pair of frameless eyeglasses includes a lens and two buckle members respectively and releasably mounted to two sides of the lens. Two hook members extend outward from each side of the lens. Each hook member includes a hook. Ea buckle member includes a compartment for receiving the hook members on an associated one of the sides of the lens. Each buckle member further includes two lateral sides. A slot is defined in each lateral side of each buckle member and in communication with the compartment. Each hook member is received in the compartment of an associated one of the buckle members, and each hook is releasably engaged with an edge defining an associated one of the slots.

5 Claims, 7 Drawing Sheets ent invention.

BUCKLE DEVICE FOR FRAMELESS EYEGLASSES

BACKGROUND OF THE INVENTION

1. Field of the Invention

The present invention relates to a buckle device for a pair of eyeglasses. More particularly, the present invention relates to a buckle device for a pair of frameless eyeglasses.

2. Description of the Related Art

In the societies that are changing fast and thus have more and more complicated relationships, eyeglasses not only provide eyesight assistance but also show the personal characteristics of the wearers. FIG. 1 of the drawings illustrates a pair of conventional frameless eyeglasses 1 including two lenses 11, two connecting members 12, and two temples 13. Each connecting member 12 has an end fixed by a screw 111 to an outer side of an associated lens 11. Each temple 13 is pivotally connected to the other end of an associated connecting member 12. Replacement of the lenses 11 is inconvenient and troublesome, as a tool such as a screwdriver is required for tightening/loosening the screws 111.

SUMMARY OF THE INVENTION

In accordance with an aspect of the present invention, a pair of frameless eyeglasses comprises a lens and two buckle members respectively and releasably mounted to two sides of the lens. Two hook members extend outward from each side of the lens. Each hook member includes a hook. Each buckle member includes a compartment for receiving the hook members on an associated one of the sides of the lens. Each buckle member further includes two lateral sides. A slot is defined in each lateral side of each buckle member and in communication with the compartment. Each hook member is received in the compartment of an associated one of the buckle members, and each hook is releasably engaged with an edge defining an associated one of the slots.

The buckle members can be detached from the lens quickly and easily, allowing easy replacement of the lens.

Preferably, each buckle member includes a frame strip extending from a top side thereof for holding the lens.

In accordance with another aspect of the present invention, a pair of frameless eyeglasses comprises a lens and two buckle members respectively and releasably mounted to two sides of the lens. Two hook members extend outward from each side of the lens. Each hook member includes a hook. Each buckle member includes a compartment for receiving the hook members on an associated one of the sides of the lens. Each compartment includes a stepped portion. Each hook member is received in the compartment of an associated one of the buckle members, and each hook is releasably engaged with the stepped portion of the associated one of the buckle members.

The buckle members can be detached from the lens quickly and easily, allowing easy replacement of the lens.

Preferably, each buckle member includes a frame strip extending from a top side thereof for holding the lens.

Preferably, each hook member includes a pressing section extending from the hook.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
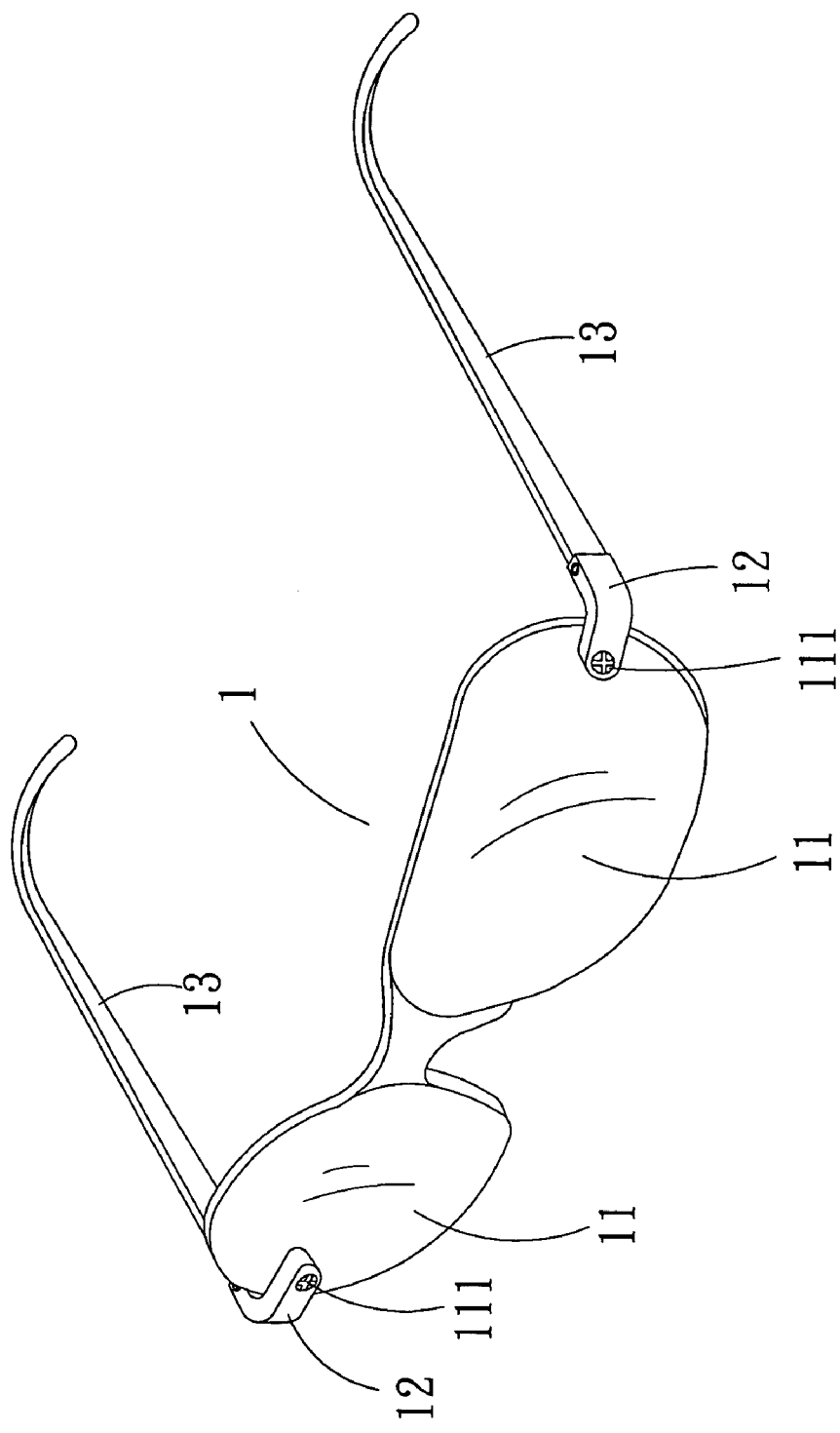
FIG. 1 is a perspective view of a pair of conventional frameless eyeglasses.
Figure 2:
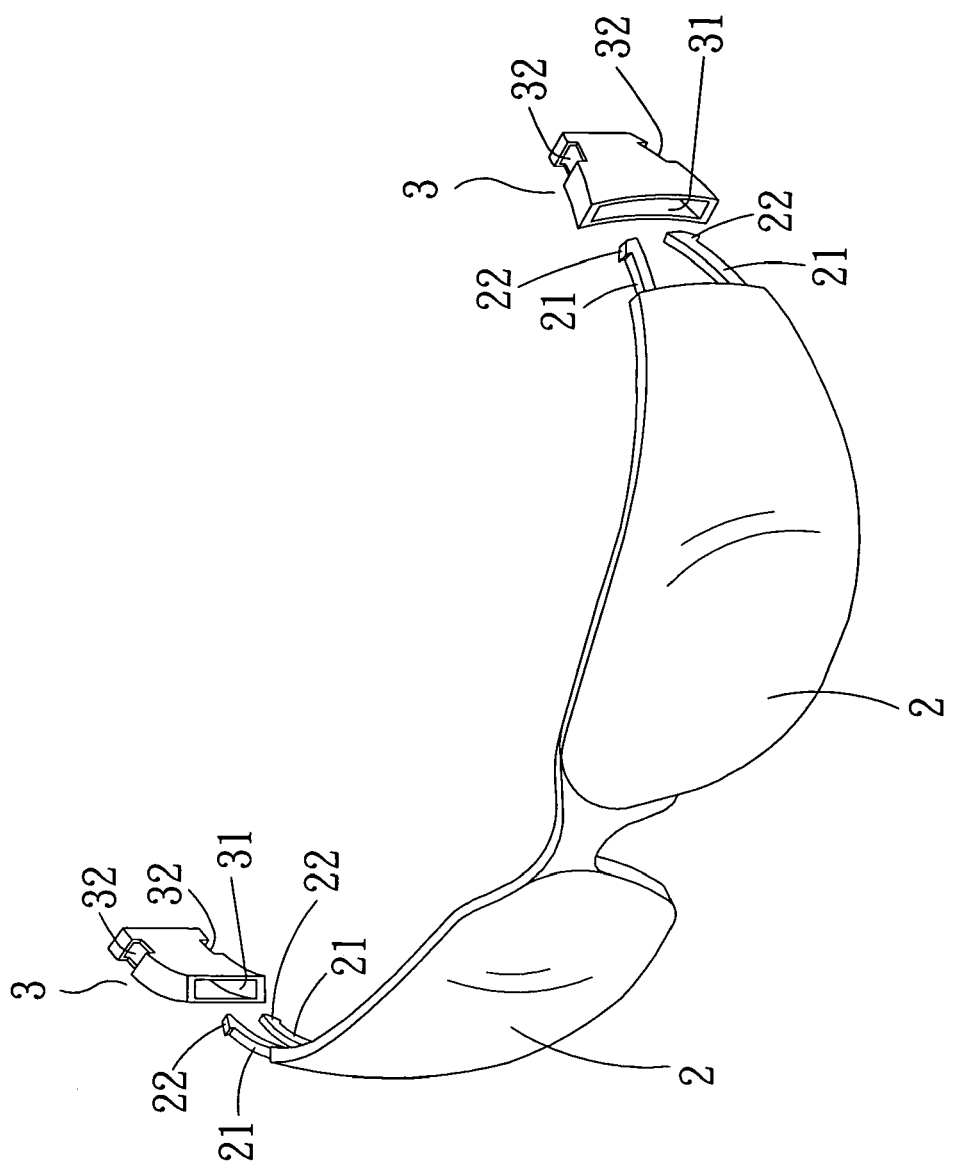
FIG. 2 is an exploded perspective view of a pair of frameless eyeglasses with a buckle member the in accordance with the present invention.
Figure 3:
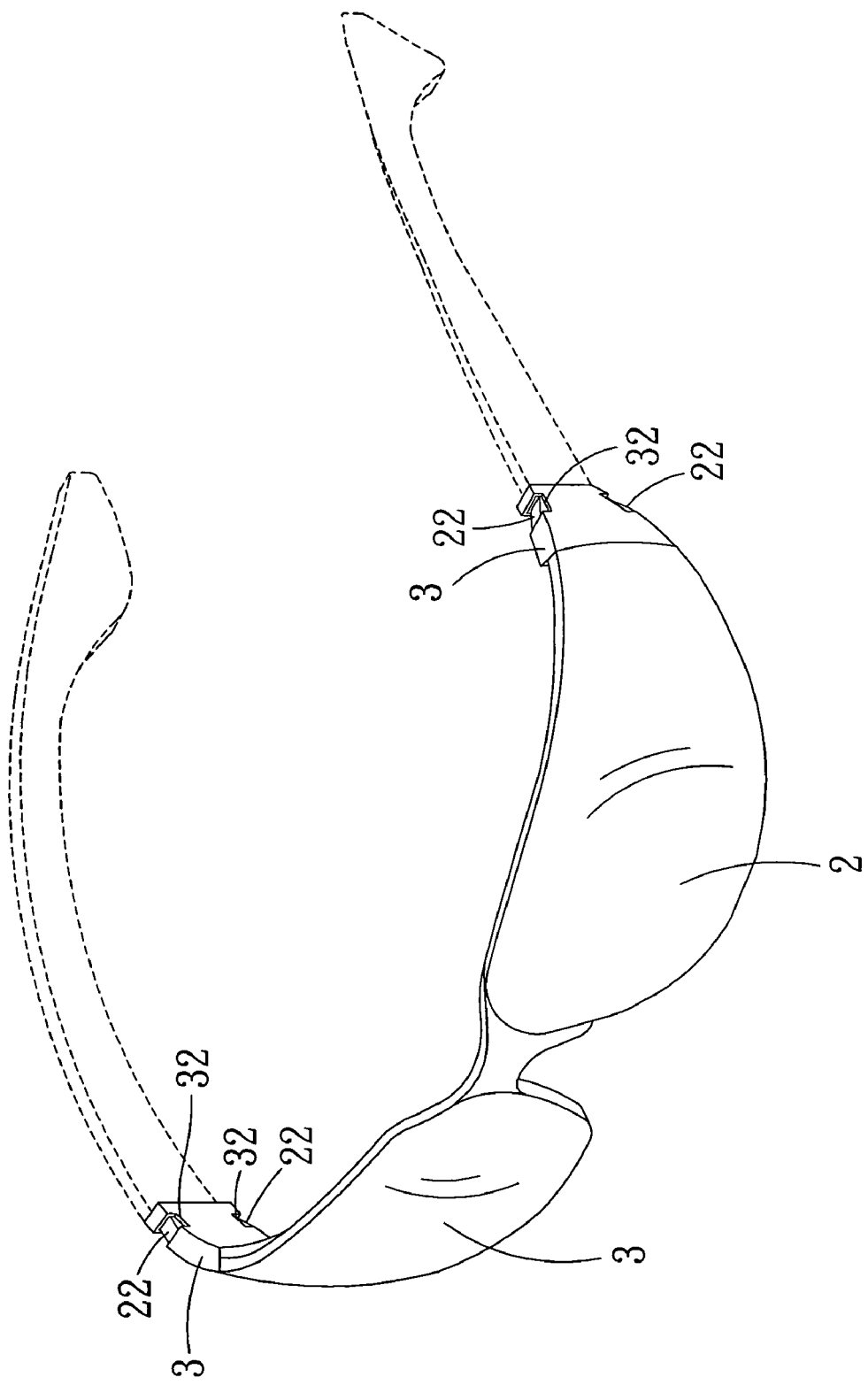
FIG. 3 is a perspective view of the pair of frameless eyeglasses in FIG. 2 after assembly.

Referring to FIGS. 2 and 3, a pair of frameless eyeglasses in accordance with the present invention comprises a lens 2 and a buckle device. In this example, the buckle device includes two hook members 21 extending outward from each of two sides of the lens 2 and two buckle members 3 for respectively and releasably engaging with the hook members 21. Each hook member 21 has a hook 22. Each buckle member 3 is hollow and includes a compartment 31 for receiving the hook members 21. A slot 32 is defined in each of two lateral sides of each buckle member 3 and in communication with the compartment 31.

Each buckle member 3 is mounted to an associated side of the lens 2. Each hook member 21 is received in the compartment 31 of an associated buckle member 3, with each hook 22 engaging with an edge defining an associated slot 32. Thus, each buckle member 3 is securely coupled to the associated side of the lens 2, as shown in FIG. 3.

When detachment is required, the user may press the hooks 22 in the slots 32 of each buckle member 3 inward into the associated compartment 31, allowing detachment of the buckle member 3 from the lens 2, which can be accomplished quickly and easily without any tools. Replacement of the lens 2 can be carried out easily.

Figure 4:
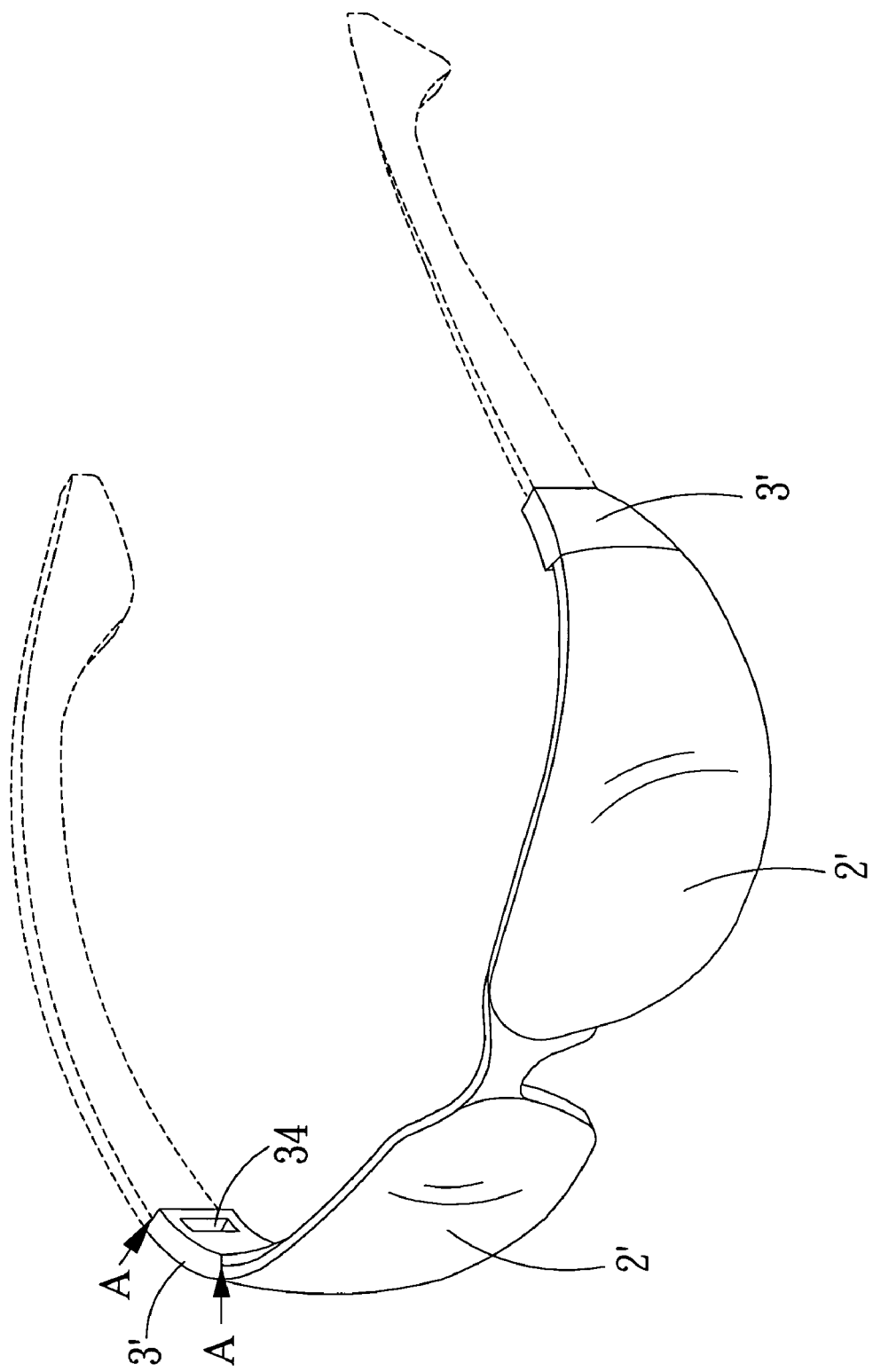
FIG. 4 is a perspective view illustrating a modified embodiment of the buckle device in accordance with the present invention.
Figure 5:
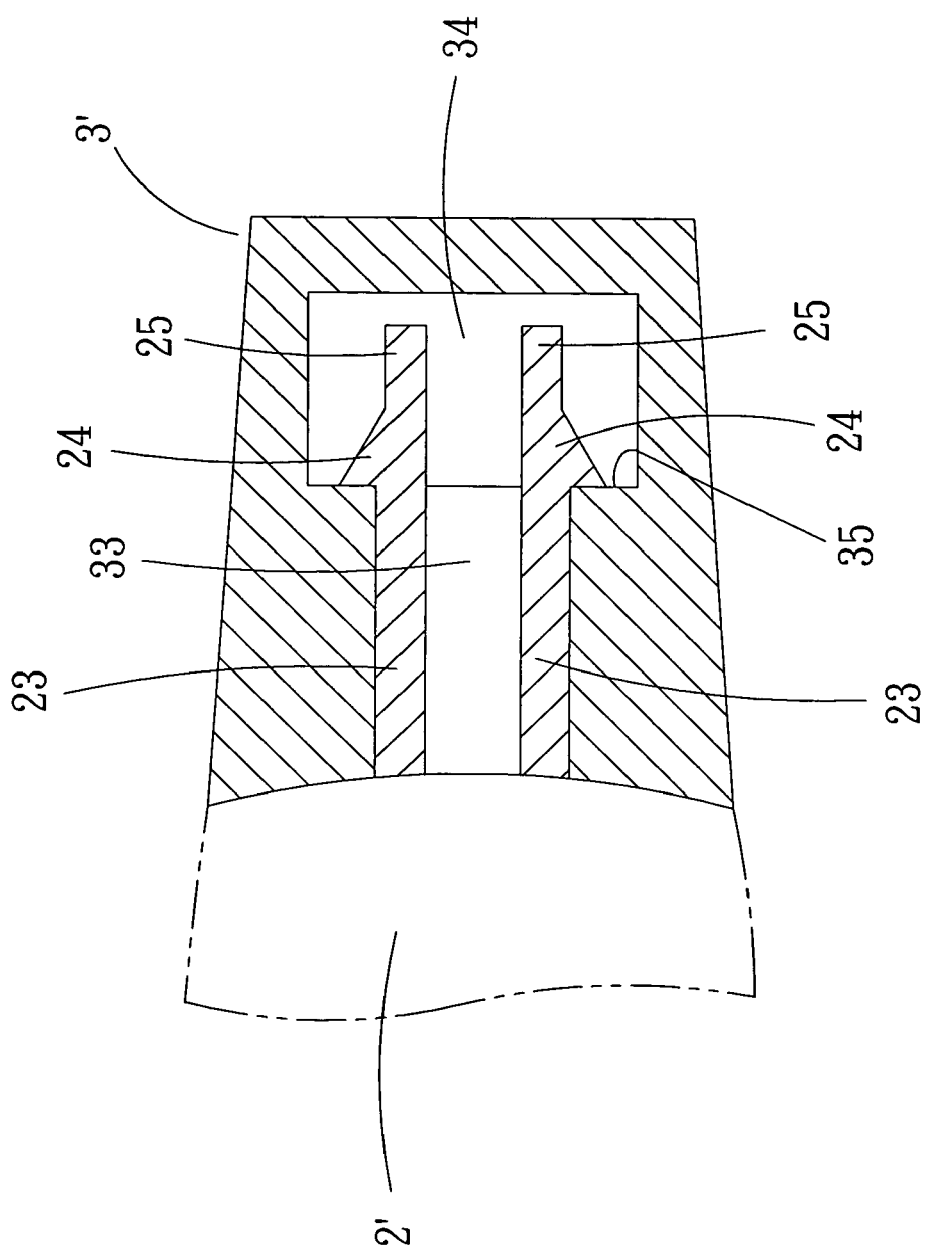
FIG. 5 is an enlarged sectional view illustrating the buckle device in FIG. 4.

FIGS. 4 and 5 show a modified embodiment of the buckle device in accordance with the present invention. In this embodiment, each buckle member 3' includes a compartment 33 having a stepped portion 35. Each buckle member 3' further includes a slot 34 in an inner side thereof and in communication with the compartment 33. Two hook members 23 extends from each side of the lens 2' and includes a hook 24 and a pressing section 25 extending from the hook 24.

With reference in FIG. 5, each buckle member 3' is mounted to an associated side of the lens 2'. Each hook member 21 is received in the compartment 33 of an associated buckle member 3', with each hook 22 engaging with the stepped portion 35 of the associated buckle member 3'. Thus, each buckle member 3' is securely coupled to the associated side of the lens 2', as shown in FIG. 3.

When detachment is required, the user may press the pressing sections 25 toward each other and thus disengage the pressing sections 25 from the stepped portion 35, allowing detachment of the buckle member 3' from the lens 2', which can be accomplished quickly and easily with or without a tool. Replacement of the lens 2 can be carried out easily.

Figure 6:
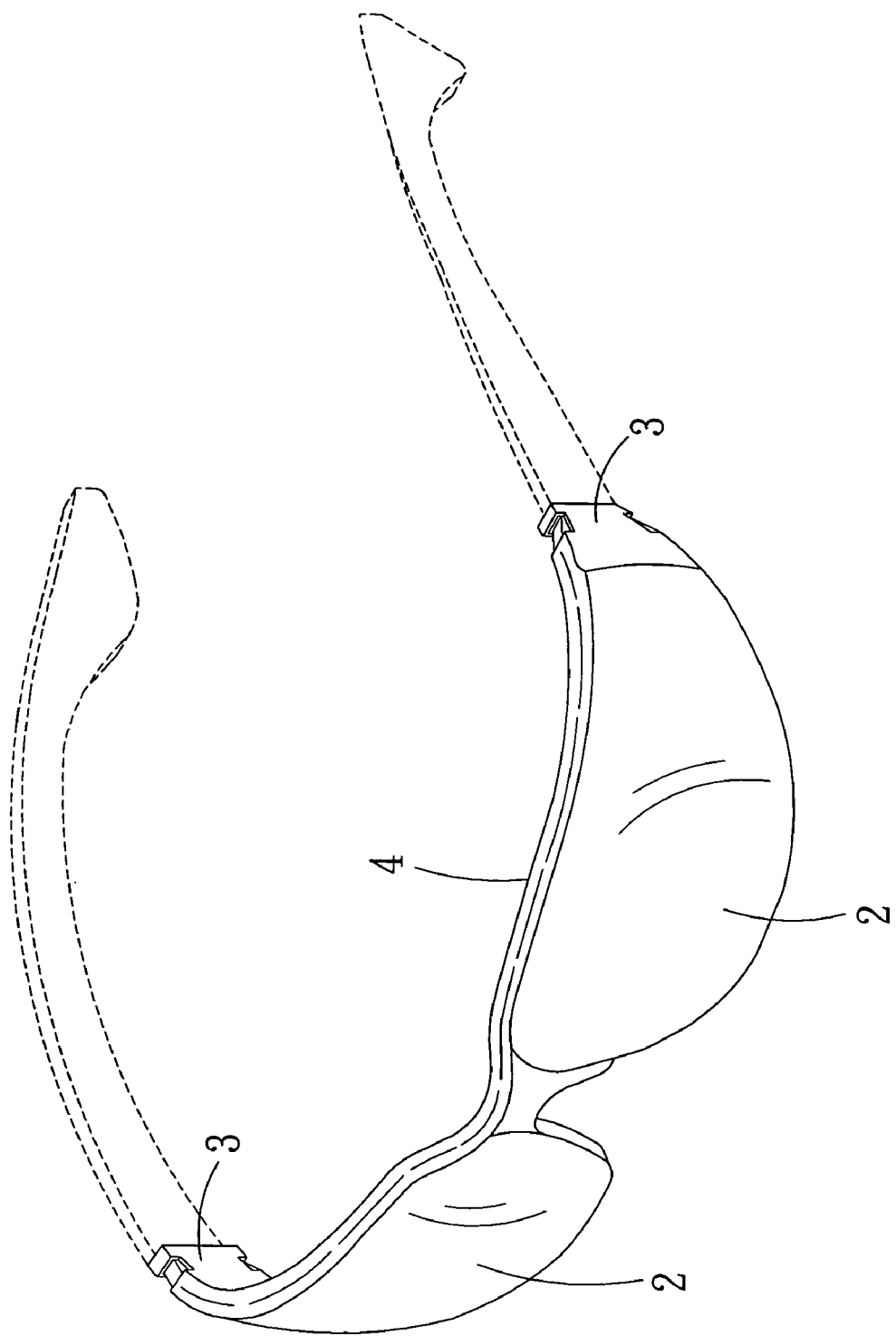
FIG. 6 is a perspective view illustrating another modified embodiment of the buckle device in accordance with the present invention.

FIG. 6 shows another modified embodiment of the buckle device modified from the embodiment of FIG. 2, wherein each buckle member 3 includes a frame strip 4 extending from a top side to provide a reliable holding effect for the lens 2.

Figure 7:
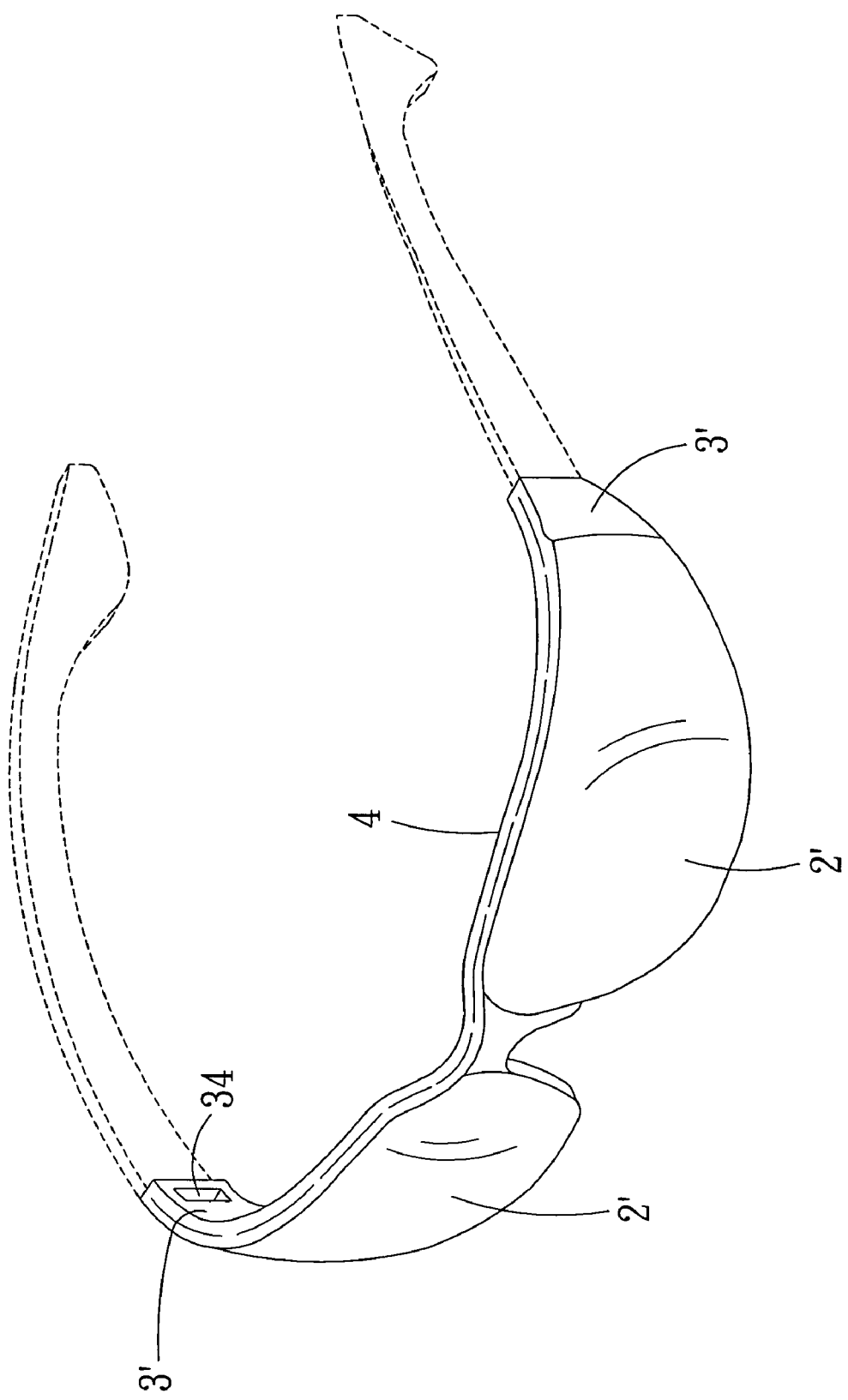
FIG. 7 is a perspective view illustrating a further modified embodiment of the buckle device in accordance with the present invention.

FIG. 7 shows another modified embodiment of the buckle device modified from the embodiment of FIG. 4, wherein each buckle member 3' includes a frame strip 4' extending from a top side to provide a reliable holding effect for the lens 2'.

Although specific embodiments have been illustrated and described, numerous modifications and variations are still possible without departing from the essence of the invention. The scope of the invention is limited by the accompanying claims.

What is claimed is:

1. A pair of frameless eyeglasses comprising:
   a lens having two sides, two hook members extending outward from each said side of the lens, each said hook member including a hook; and
   two buckle members respectively and releasably mounted to the sides of the lens, each said buckle member including a compartment for receiving the hook members on an associated one of the sides of the lens, each said buckle member further including two lateral sides, a slot being defined in each said lateral side of each said buckle member and in communication with the compartment;
   wherein each said hook member is received in the compartment of an associated one of the buckle members, and each said hook is releasably engaged with an edge defining an associated one of the slots.

2. The pair of frameless eyeglasses as claimed in claim 1 wherein each said buckle member includes a frame strip extending from a top side thereof for holding the lens.

3. A pair of frameless eyeglasses comprising:
   a lens having two sides, two hook members extending outward from each said side of the lens, each said hook member including a hook; and
   two buckle members respectively and releasably mounted to the sides of the lens, each said buckle member including a compartment for receiving the hook members on an associated one of the sides of the lens, each said compartment including a stepped portion;
   wherein each said hook member is received in the compartment of an associated one of the buckle members, and each said hook is releasably engaged with the stepped portion of the associated one of the buckle members.

4. The pair of frameless eyeglasses as claimed in claim 3 wherein each said buckle member includes a frame strip extending from a top side thereof for holding the lens.

5. The pair of frameless eyeglasses as claimed in claim 3 wherein each said hook member includes a pressing section extending from the hook.

* * * * *